Jan. 25, 1966          G. ROMI          3,230,830
RACK BAR CUTTING MACHINE
Original Filed July 10, 1957          7 Sheets-Sheet 1
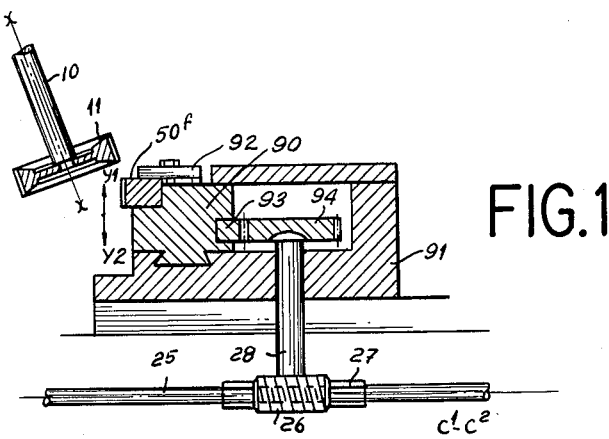
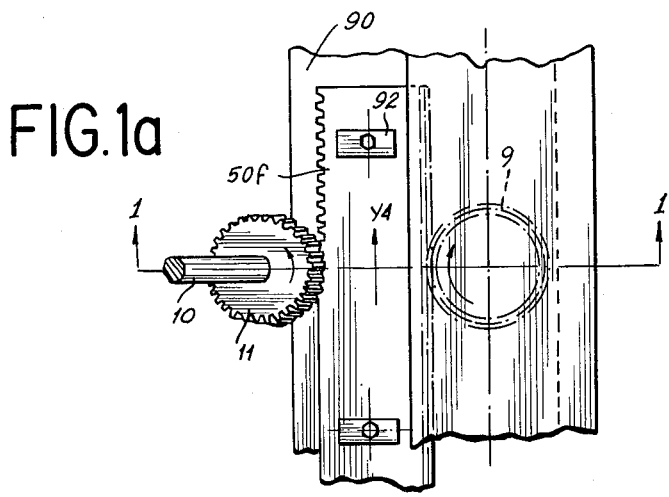
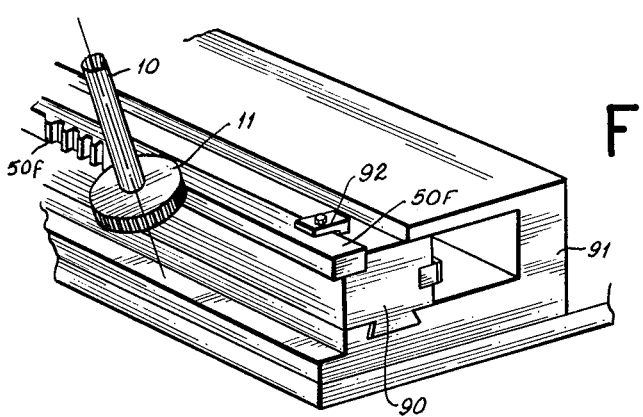
INVENTOR.
Giordano Romi
BY Michael S. Striker
Attorney Jan. 25, 1966  G. ROMI  3,230,830
RACK BAR CUTTING MACHINE
Original Filed July 10, 1957  7 Sheets-Sheet 4

INVENTOR:
Giordano Romi
By:
Michael S. Striker
Attorney

Jan. 25, 1966 G. ROMI 3,230,830
RACK BAR CUTTING MACHINE
Original Filed July 10, 1957 7 Sheets-Sheet 5

INVENTOR:
Giordano Romi
BY:
Michael S. Striker
Attorney

Jan. 25, 1966 G. ROMI 3,230,830
RACK BAR CUTTING MACHINE
Original Filed July 10, 1957 7 Sheets-Sheet 6

INVENTOR:
Giordano Romi
BY:
Michael S. Striker
Attorney

Jan. 25, 1966  G. ROMI  3,230,830
RACK BAR CUTTING MACHINE
Original Filed July 10, 1957  7 Sheets-Sheet 7
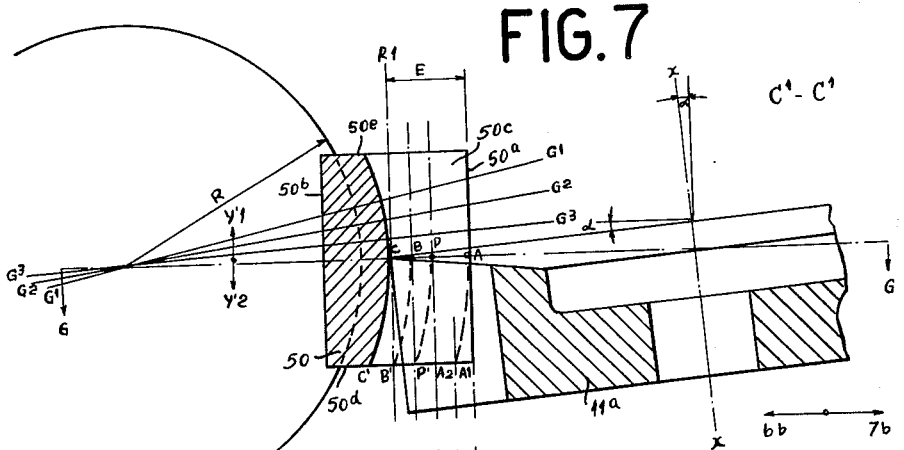
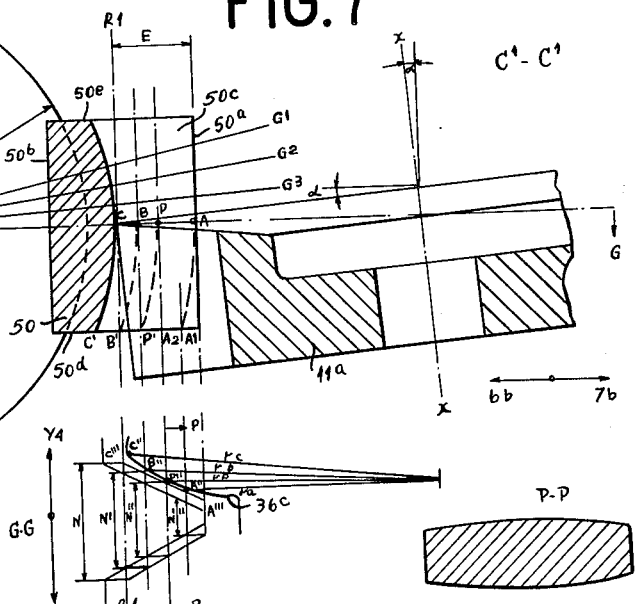
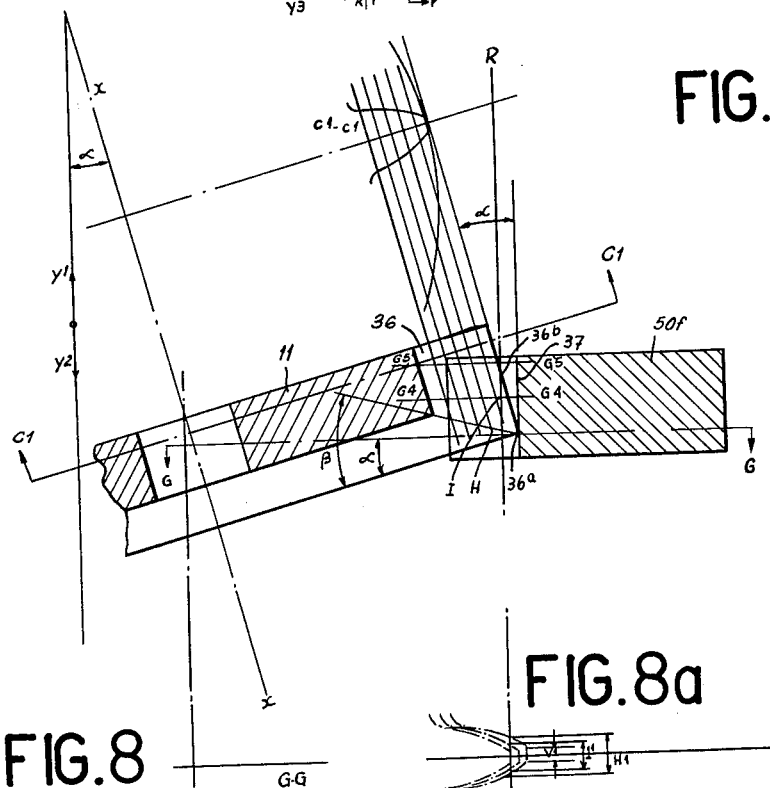
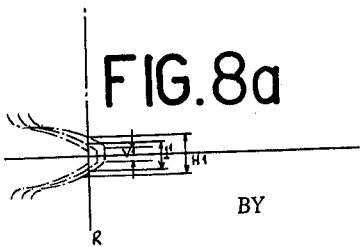
INVENTOR.
Giordano Romi
BY Michael S. Striker
Attorney United States Patent Office 3,230,830
Patented Jan. 25, 1966

1

3,230,830
RACK BAR CUTTING MACHINE
Giordano Romi, Santa Barbara d'Oeste, Brazil
Original application July 10, 1957, Ser. No. 671,095, now Patent No. 3,089,392, dated May 14, 1963. Divided and this application May 6, 1963, Ser. No. 278,017
Claims priority, application Brazil, June 27, 1957, 95,280
19 Claims. (Cl. 90—3)

The present invention relates to a rack bar cutting apparatus for cutting rack bars by means of the generation method, in which a tooth profile, rolling in synchronism and coupled to a moldable piece, will "generate" on this moldable piece the exact tooth profile suitable for engagement with itself. The present application is a divisional application of my copending application Serial Number 671,095, filed July 10, 1957, and issued as U.S. Patent 3,089,392.

An object of the invention is to provide the necessary reciprocating movements in the generation method in such a way that the chief reciprocating movement by means of which the cutting action is performed, is transmitted to a secondary longitudinal reciprocating movement of the turning axis of the cutting gear wheel.

Another object of the invention is to allow the use, during the generation operation, of cutting depths and advances substantially heavier than the normally allowable in the conventional methods and machines.

The main object of the invention is to perform the cutting of rack bars.

A further object of the invention is to apply the invention to a new straight teeth racks generating machine which has absolutely new and original characteristics.

A still further object of the invention is to apply the invented method to a new helicoidal teeth racks generating machine which has also absolutely new and original characteristics.

Another object of the invention is to make the cutter used in the new method as actually consisting of a suitably characterized gear wheel, like a master gear, with involute profile teeth, which allows to obtain the same results as obtained by the conventional methods, keeping present the following basic conditions:

FOR CUTTING RACKS (I) To create on one face of the gear wheel (cutter)—cutting face—a conical surface the geometrical axis of which is coincident (coaxial) with the geometrical axis of the wheel, and having a suitably dimensioned vertex angle. This conical surface is formed by sharpening the cutter in such a way that the cutting edges of the teeth of the gear wheel (cutter) are formed by the intersection of said conical surface with said teeth.

(II) To incline the gear wheel (cutter), that is to say to incline all the planes perpendicular to the turning axis of the gear wheel (cutter) through a suitable angle in relation to the plane which contains the longitudinal axis of the blank rack at the moment in which this plane coincides with the generation plane.

(III) The direction of displacement for generating the rack is to be parallel to the intersection of any plane perpendicular to the axis of the gear wheel (cutter) with the generation plane, that is to say, it is to be parallel to the longitudinal axis of the blank rack.

(IV) To impart a reciprocating movement in a direction perpendicular to the longitudinal axis of the rack, this direction making, with the turning axis of the gear wheel at the generation act the same angle as defined in (II).

(V) To keep substantially constant the inclination angle of the gear wheel (cutter), as defined in (II).

A still further object of the present invention is to allow the use of a pattern gear with helicoidal teeth of suitable

2 characteristics as gear wheel cutter, as a result of which helicoidal racks may be generated.

Another object of the present invention is to avoid the use of additional devices required in the conventional methods, in order to obtain some special characteristics; this is automatically done when the invention is applied to the new racks generating mechanisms.

Another object of the invention is to provide that by using as cutter a pattern gear wheel of suitable characteristics, and by observing the basic conditions, it is no more necessary that the flanks of the cutter's teeth are formed by involute helicoid surfaces, or like surfaces specially developed as occurs by using the known processes; similarly, it is no more necessary that the heads of the teeth have such an exit angle that their widths, through any plane perpendicular to the turning axis of the cutter are kept approximately constant; it is also no more necessary to keep approximately constant the cutting depth during all the useful life of the cutter, neither is it any longer necessary that the teeth's profiles are specially determined and corrected in order to ensure, after each sharpening, cutting characteristics more or less constant.

A still further object of the invention is to allow that the gear cutter works during all its life and even after several sharpening operations always with constant operating or cutting pressure angle, differently from the conventional methods, which are characterized by the fact that they operate with cutting or operating pressure angles which are changed after each sharpening operation.

A still further object of the invention is to facilitate the construction of the cutter without using any specially designed equipment, but using only the ordinary standard machinery which is normally employed to cut and rectify precision cylindrical gears.

A still further object of the invention is to cut pieces of various different shapes, always making use of the generation principle.

With these objects in view, one embodiment of the invention comprises a rotary cutter gear means having a first axis of rotation; blank holder means rotatable about a second axis and adapted for holding at least one rack bar blank in a position parallel to the axis and in meshing engagement with the cutter gear means; and operation control means for moving in a timed sequence one of the above-mentioned means in a direction inclined at an acute angle to the axis of said cutter gear means for effecting cutting of the rack bar blank by the gear cutter means in a generating movement.

Other advantages and further objects of the present invention will be evident from the following description, which is made in connection with the appended drawings, and given both description and drawings by way of non restrictive example.

FIG. 1a is a plan view, FIG. 1b is a perspective view, and FIG. 1 is a sectional view on line 1—1 in FIG. 1a illustrating one embodiment of a rack bar cutting mechanism.

FIGS. 2a and 2c are side views, and FIGS. 2b and 2d are sectional views taken on line 2d—2d, and line 14d—14d, respectively, and illustrating two embodiments of cutters of the present invention.

Figure 5:
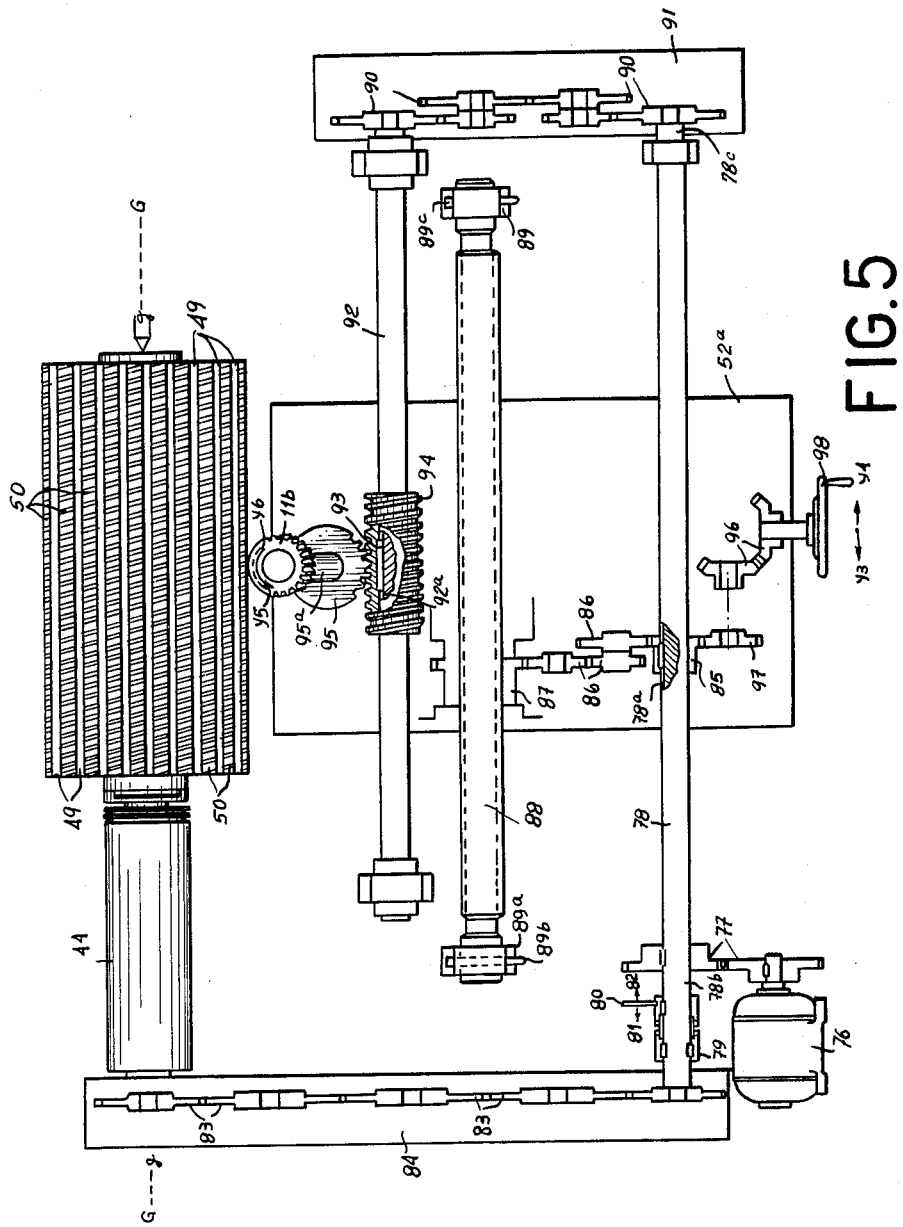

FIG. 5 diagrammatically shows a modified embodiment for cutting helicoidal teeth in rack bars.

Figure 6:
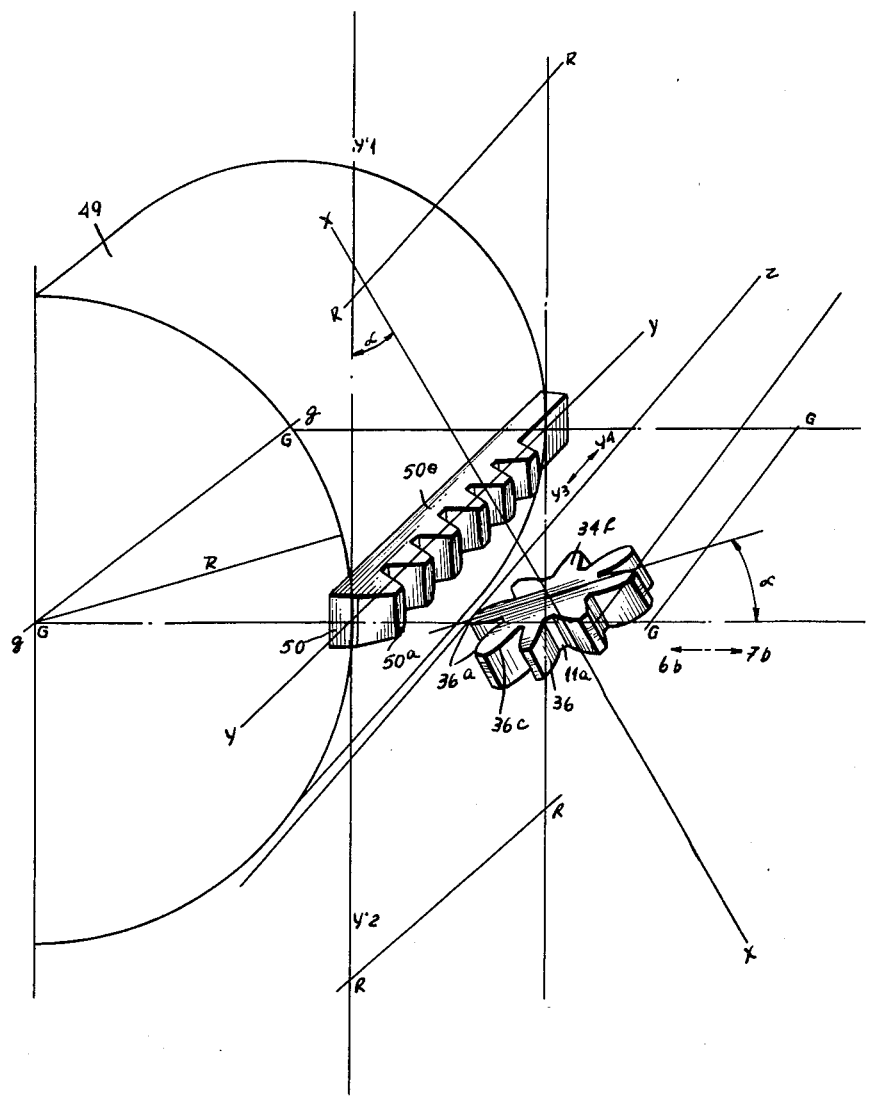

FIG. 6 diagrammatically shows the relative positions of the gear cutter and of the rack blank, when the new method is applied to the rack cutting mechanism.

FIG. 7 diagrammatically shows the relative positions of the gear cutter and of the rack blank, at the generation act.

FIG. 7a shows projections of a tooth, and FIG. 7b is a sectional view taken on line P—P in FIG. 7a.

FIG. 8 diagrammatically shows the relative positions of the gear cutter and of the piece to be cut, and FIG. 8a shows several projections of a tooth of the gear wheel (cutter) on the generation plane.

Referring now to the drawings, the embodiment illustrated in three views in FIGS. 1, 1a, 1b is adapted to cut rack bars in the same manner as the gear cutting mechanism disclosed in my U.S. Patent, 3,089,392. However, the circular movement of the gear blanks is transformed into a linear movement of a rack bar blank. A carriage 90 is movable along a bed 91 and has holding means 92 for holding a rack bar blank 50f extending in the direction of movement of carriage 90. A rack bar 93 is secured to carriage 90 and meshes with a pinion 94 driven by shaft 28 which carries a worm gear 26 meshing with a worm 27 on the driven shaft 25 so that the carriage can be moved longitudinally with rack bar 50f.

Figure 2A:
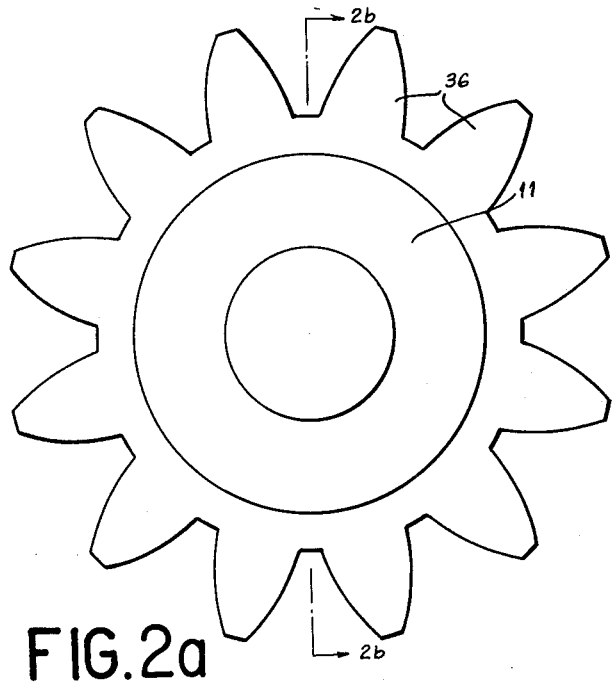
Figure 2B:
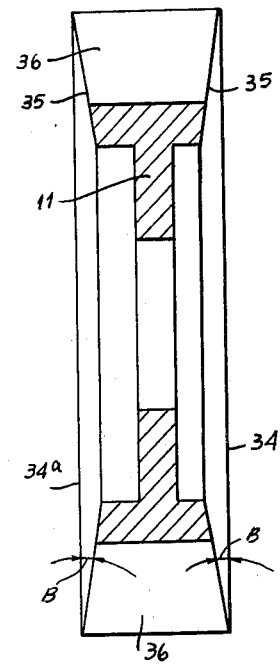

A cutter whose shape is best seen in FIGS. 2a and 2b is supported, as described in detail in my U.S. Patent 3,089,392 for movement in the direction of the axis $x$—$x$ of its shaft 10, and also for movement in the direction of the arrows $y_1$ and $y_2$ perpendicularly to the direction in which the rack bar 50f extends. The operation is the same as described for the gear cutting operations in my U.S. Patent 3,089,392, and the movement of the cutter in the direction of the arrow $y_2$ is a cutting stroke, while the movement in the direction $x$—$x$ is used to withdraw the cutter from the cut groove.

Figure 3:
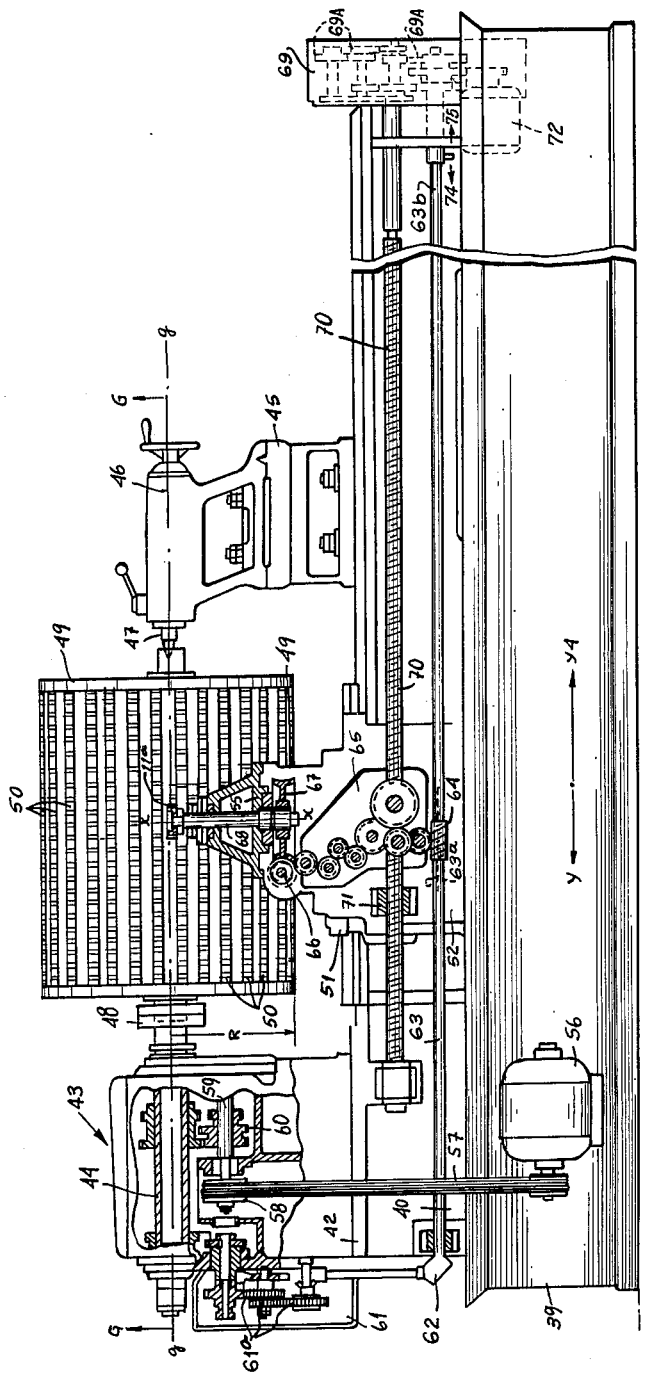
FIG. 3 is a diagrammatic front view of the new straight teeth racks cutting mechanism.

The new generating machine for straight rack bars is diagrammatically represented in FIGS. 3 and 5 of the appended drawings, by way of non restrictive example.

The base 39 supports the working bed 40, similar to the beds commonly used in machine tools. The machine bed 40 is provided with prismatic guides 41, parallel to each other, the longitudinal axes of which are contained in planes parallel to the direction of the rack bar generation movement, marked by arrows $Y_3$–$Y_4$.

The bed 40 is provided, at one of its ends, with a plane surface 42 parallel to the axis of the prismatic guides 41; on this surface is disposed the main head stock 43, similar to the head stocks commonly used in machine-tools; said head stock is so disposed that the shaft 44 can rotate about a turning axis $g$—$g$ parallel to the direction of the racks generation movement, marked by arrows $Y_3$–$Y_4$. The turning axis $g$—$g$, also called center line, is located in a plane parallel to the plane of the longitudinal axis of the prismatic guides 41 and will be called heretofore generation plane G—G (see FIGS. 3, 4, 5, 6, 7).

The tail stock 46, together with the bracket block 45, can slide along the prismatic guides 41 in either the two directions marked by arrows $Y_3$–$Y_4$, in such a way that the geometric axis of the center 47, which is fixed to the tail stock 46, always coincides with the center line $g$—$g$, in any position of the tail stock 46 along the prismatic guides 41.

Consequently, the geometric axis of the point 47 will be always contained in the generation plane G—G.

A cylinder 49 of suitably dimensioned external radius R is fixed to the flange 48, which is fixed to the shaft 44—this shaft being supported by head stock 43—and turns on the center 47. Cylinder 49 can rotate together with the shaft 44 with its geometric axis coincident with the turning axis and with the center line previously defined.

In this way any radial plane which contains the geometric axis of the cylinder 49 will pass through the center line $g$—$g$. The particular radial plane which is parallel to the plane of the prismatic guides 41 will coincide with the generation plane G—G above defined.

All the generating lines of the cylinder 49 will be further parallel to the center line $g$—$g$.

On the cylinder 49 are mounted several prismatic bars or blanks 50, of rectangular cross section which will be hereinafter named rack blanks 50. These bars are so disposed that their geometric longitudinal axes are parallel to the axis of the cylinder 49 and therefore parallel to the direction of displacement marked by arrows $Y_3$–$Y_4$, and that two faces of the rack blanks 50 are parallel to the corresponding radial plane passing through the respective longitudinal axis of the blank, while the two other faces are parallel to the corresponding plane passing through the respective longitudinal axis and tangential to the cylinder 49.

The rectangular cross section of the rack bars is assumed only for explanation purposes, but does not restrict the present invention because the cited cross section may be of any shape.

Under these conditions, during the rotary movement of the cylinder 49, when the radial plane associated with any one of the rack blanks 50 coincides with the generation plane G—G, this particular rack blank will have two faces parallel to the generation plane G—G and the two other faces parallel to a plane which is perpendicular to the generation plane G—G and which will be called reciprocating plane R—R.

All the racks, therefore, will be generated at the moment when they reach the particular above defined position, which will be called generation position, FIG. 6.

A carriage 51 with an apron 52 is movable in either of the two directions indicated by the arrows $Y_3$ and $Y_4$, and supported and guided by the prismatic guides 41. On apron 52 are mounted the driving mechanisms for movement in the direction $Y_3$–$Y_4$; this movement is hereinafter called displacement movement for rack generation and is suitably synchronized with the rotatory movement of cylinder 49 and with the rotatory movement of the rack cutter 11a, as will be better explained below.

On the carriage 51 (FIG. 4) is fixed the slide 53 which can be transversally moved in either of the two directions shown by the arrows 6b and 7b. This movement is caused by means of the hand operated crank 54.

On the table 53 is fixed the auxiliary head 55, which supports the cutter 11a. The cutter 11a which can rotate about axis X—X is mounted on the auxiliary head 55 in such a manner that any plane perpendicular to the turning axis X—X makes a constant angle $\alpha$ with the generation plan G—G above defined, the intersection of the particular one of said planes which contains the cutting face 34b of the cutter 11a being a line Z—Z which lies in the generation plane G—G and is parallel to the longitudinal axis $Y_3$–$Y_4$ of the rack blank 50 (FIG. 6).

As a result of the above stated, the turning axis X—X will be contained in a plane which makes the same inclination angle $\alpha$ with the reciprocating plane R—R above defined.

In other words, the cutter 11a is rotatable about its axis X—X and shiftable in either of the two directions indicated by arrows $Y_3$ and $Y_4$, together with the carriage 51. The two movements are synchronized with the rotary movement of the cylinder 49 about the center axis $g$—$g$, as will be later explained. The cutter 11a can also be moved together with the table 53 in either of the two directions marked by arrows 6b and 7b.

The synchronization of the three main movements required for the generation of racks in accordance with the present invention, namely: rotary movement of cylinder 49 about the center axis $g$—$g$, rotary movement of cutter 11a about its axis X—X, and displacement of cutter 11a in either of the two directions marked by arrows $Y_3$ and $Y_4$, is obtained as follows by the machine shown in FIG. 3.

The power of the electric motor 56 is transmitted over the belts 57, pulleys 58, intermediate shaft 59 and speed changing gears 60 to the shaft 44. From this shaft 44 and over the gears 61a of the gear box 61, the movement is transmitted to a pair of bevel gears 62, coupled to the rod 63 which will rotate in a suitable speed relation with the shaft 44 and consequently with the cylinder 49, which is fixed to shaft 44. The transmission ratio will depend upon the selection of the gears 61a in the gear box 61. The rod 63 is used for transmitting the rotary movement of cutter 11a about its axis X—X and for displacing the cutter 11a together with carriage 51 and apron 55 in either of the two senses marked by arrows $Y_3$ and $Y_4$ as will be seen later.

The rod 63, which has through almost all its length an axial groove 63a, transmits the movement to the worm screw 64, which is coaxial with the rod 63 and is mounted on the apron 52 in such a manner that it can axially move along the rod 63 together with said apron 52 in either of the two directions indicated by the arrows $Y_3$ and $Y_4$.

The endless screw 64 transmits the movement to the worm screw 66, over the change gears 65. Worm screw 66 is coupled to the helicoidal crown gear 67, fixed to shaft 68 on which cutter 11a is mounted.

Power and movement are thus transmitted from shaft 44 to the cutter 11a.

Dut to the transmission of power and rotary movement by gear box 61, bevel gears 62, rod 63, worm screw 64, change gears 65, worm screw 66, and crown gear 67 of shaft 68 to cutter 11a at a predetermined ratio, the cutter 11a and the cylinder 49 will rotate in a timed relationship.

The rod 63, by means of its end 63b, transmits the movement to the gears of the gear box 69, from which the movement is transmitted over the gears and shafts therein contained to the threaded spindle 70 at a suitable ratio. This threaded spindle and the cooperating nut 71, fixed to the apron 52, causes the displacement of the cutter 11a, which is moved together with the supplementary head or support 55, the table 53, the carriage 51 and the apron 52, in either of the two directions indicated by arrows $Y_3$ and $Y_4$.

The transmission of power and movement from the rod 63 over gears and shafts 69a of the gear box 69, threaded spindle 70, nut 71 and apron 52 to the cutter 11a is effected at a predetermined relationship with the angular speed of the rotating cylinder 49 so that the cutter 11a will move in either of the two senses in a timed relationship with the rotary speed of cylinder 49.

Since the transmission of the rotatory and linear movements of the cutter 11a is effected, as above stated, in such a manner that it is possible to change the speed ratios by means of change gear boxes 61, 65 and 69, the new machine can produce with a cutter of suitably determined characteristics a large number of racks with different pitches, pressure angles and depths.

In order to perform rapid displacement movements for adjusting and presetting purposes, there is provided an auxiliary motor 72, by means of which the threaded spindle 70 may be operated, over the gear and shafts 69a of gear box 69 and independently of rod 63, which can be disengaged from box 69, before starting the motor 72. On finishing the desired rapid movement and disconnecting the motor 72, the rod will be reengaged to the gear box 69 by moving the lever 73 in the direction of the arrow 74. A conventional locking device, not shown, which does not form part of this invention is provided in order to avoid the simultaneous transmission of opposite rotatory movements from motor 72 and rod 63 to the gear 69a.

In this way, when the lever 73 has been replaced into its normal working position, as indicated by arrow 75, the locking device automatically prevents the energizing of motor 72.

A modified embodiment for cutting helicoidal teeth in rack bars according to the new method of the invention is quite similar to the above described new machine for cutting straight teeth racks which is represented in FIG. 5, no changes being noted in the relative position of the cylinder 49, rack blanks 50 and cutter 11b.

The main differences between the machine for cutting helicoidal teeth in rack bars and the machine for cutting straight teeth in rack bars concern the cutter 11b, which has helicoidal teeth instead of straight ones, and to the transmission and relationship of the movements of the cylinder 49 and cutter 11b.

In order to meet the conditions of motion transmission required for generating helicoidal teeth on rack bars it is necessary to make the displacement of the rack bars to be cut in either the direction marked by arrows $Y_3$ and $Y_4$ equal to the displacement on the pitch circle of the cutter during its rotary movement and, at the same time, equal to the displacement of the same cutter in either of the two directions marked by arrows $Y_3$-$Y_4$, depending upon the sense of development of the helix and upon the sense of the rotary movement of the cutter.

In practice, the above conditions are satisfied by the new rack bar cutting machine, as shown in FIG. 17, which is an exemplary embodiment given only for explanation purposes.

The motor 76 transmits power and movement to the rod 78 over the gears 77. Rod 78 is provided, along almost all its length, with a longitudinal groove 78a.

One of the ends 78b is coupled—by means of the coupling gear 79, over lever 80 when this is moved in the direction indicated by arrow 81—to the gears 83 within a gear box 84. Over these gears 83, the movement is transmitted to the shaft 44 and therefrom to the cylinder 49, on which are mounted the rack blanks 50. The cylinder 49, therefore, rotates together with the shaft 44, in a suitable speed relationship with the rod 78. Along the rod 78 can slide gear wheel 85 which is supported by the apron 52a and coupled to a set of change gears 86, also supported by apron 52a, and which transmit the motion to a gear wheel 87 mounted on the apron 52a. The gear wheel 87 is coupled to the threaded spindle 88, which is rigidly fixed to the bed of the machine by means of pins 89b and 89c provided in the bearings 89 and 89a. Gear wheel 87, on turning about its geometric axis which coincides with the geometric axis of the threaded spindle 88, is forced to move in either the two senses marked by arrows $Y_3$-$Y_4$, together with the apron 52a and the cutter 11b.

The transmission ratio between the movements of the cutter—in either the two senses of linear displacement marked by arrows $Y_3$-$Y_4$ and in either the two senses of revolution marked by arrows $Y_5$ and $Y_6$—and the rotary movement of the cylinder 49 is determined by the pitch and sense of the helices on the rack blanks, by the circular pitch of cutter 11b, and by the number of revolutions of cylinder 49 needed to generate in the rack blanks 50 a complete pitch, similar to the cutter pitch.

The desired relationship between the above mentioned movements will be obtained by means of suitable combination of the change gears 90 in the gear box 91, gears 68 on the apron 52a and gears 83 in the gear box 84.

The end 78c of the rod 78 is coupled to the gears 90 of the gear box 91, from which power and movement are transmitted to a rod 92 provided along almost all its length with a groove 92a. On rod 92 is slidably mounted by means of a key 92 an endless worm screw 94 which is fixed to apron 52a.

The worm screw transmits its rotary movement to the helical crown gear 95, to which is coupled the cutter 11b by means of the shaft 95a.

The transmission of the rotary and linear movements of the cutter 11b is effected, as above stated, in such a manner that the spaced ratios can be changed by means of the change gears 83, 86 and 90, so that it is possible to produce with any cutter 11b having suitably determined characteristics, a large number of different racks.

Figure 4:
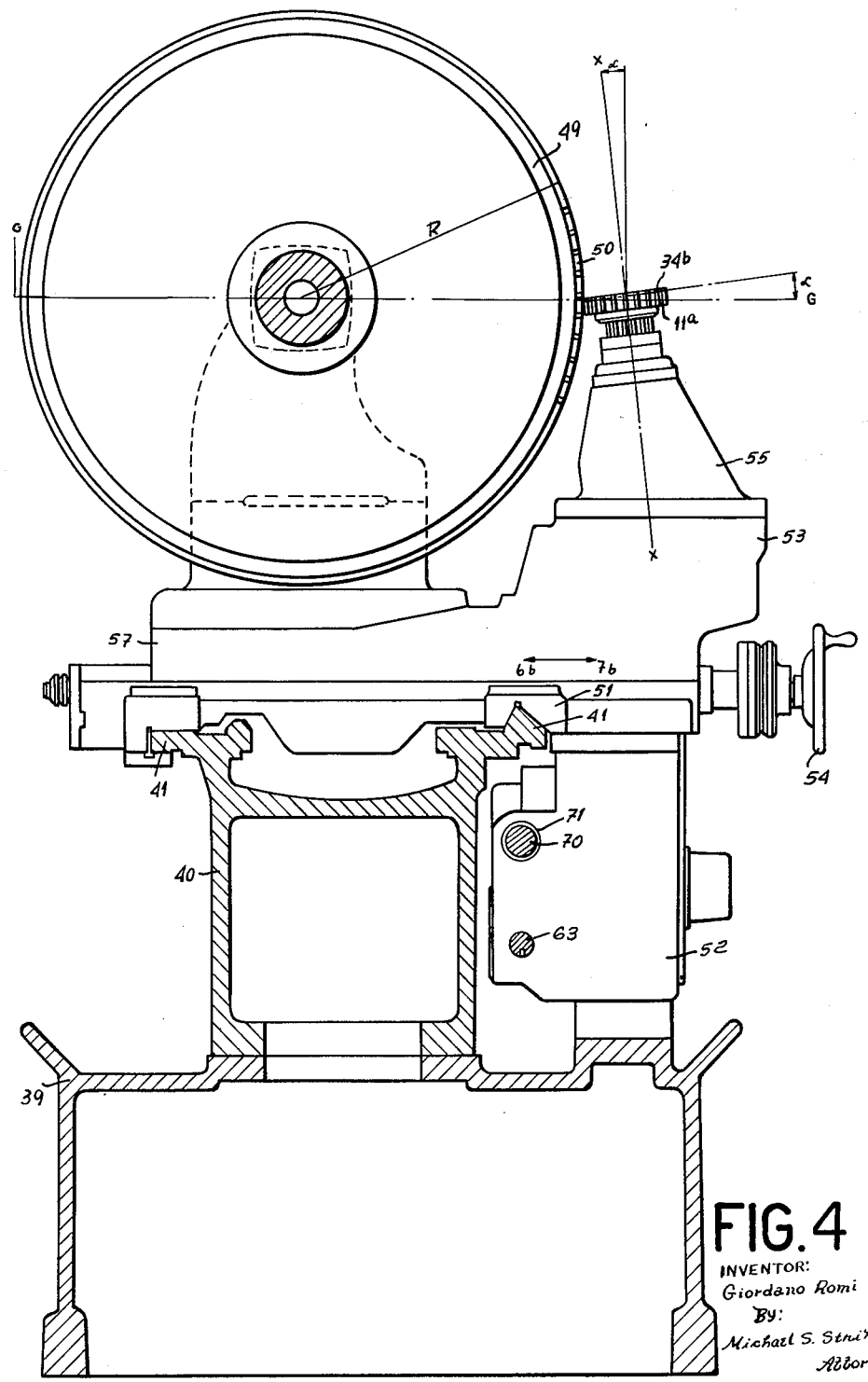
FIG. 4 is a diagrammatic side view of the new straight teeth racks cutting mechanism.

In order to achieve adjustments and manual operation of the apron 52a, a hand wheel is provided on the apron. This hand wheel is coupled to a pair of bevel gears 96 which are coupled by means of a gear wheel 97 to the gear wheel 85. The gear wheel 85 is driven after disengaging the rod 78 from the gears 83. This disengagement is obtained by moving lever 80 in the direction marked by arrow 82 and after spacing the cutter 11b from the cylinder 49 in the direction marked by arrow 7b (FIG. 4).

Figure 2C:
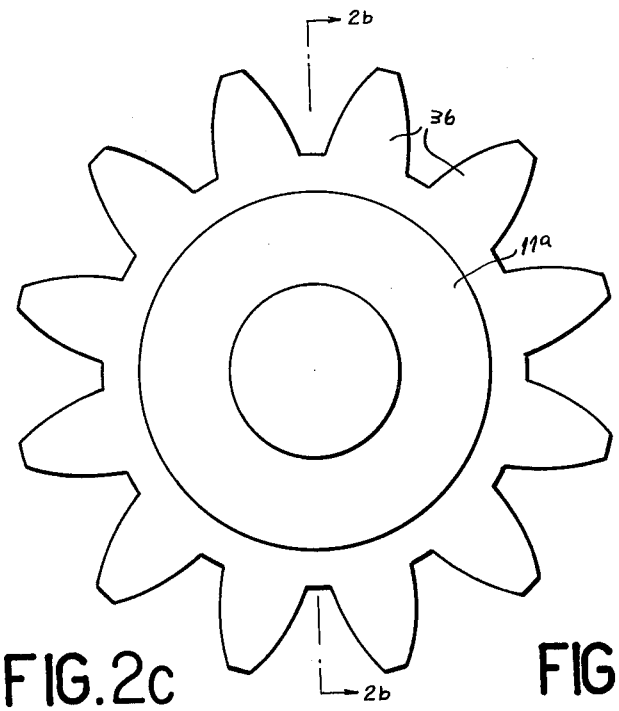
Figure 2D:
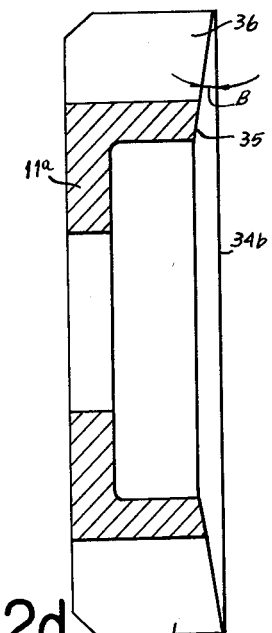

The cutter 11a used in the embodiment of FIG. 3 is shown in FIGS. 2c and 2d and is similar to the cutter 11 represented in FIGS. 2a and 2b which may be used in the embodiment of FIG. 1, the difference between them being that the cutter 11a has a conical surface 35 only on one end face 34b, while the cutter 11 has two conical surfaces, one on each face, as shown in FIG. 14b. The illustrated cutter has straight teeth, but helicoidal teeth may be substituted for cutting rack bars with helicoidal teeth.

This conical surface the geometric axis of which coincides with the turning axis of the cutter 11a is obtained by sharpening the cutter 11a, in such a manner that the intersections of said conical surfaces 35 with the teeth 36 form the cutting edges of the cutter 11a.

Referring now to FIGS. 6 and 7, which represent the relative positions of the cutter 11a and the rack blank 50 as above explained in connection with the new cutting machines for straight and helicoidal teeth racks, and referring hereinafter to this relative position as generation position, the rack teeth cutting operation will now be described. For explanation purposes and without restricting the invention, the description will be made only in connection with straight teeth racks.

The cylinder 49 turning about the axis $g$—$g$ in synchronism with the revolutions and displacement of the cutter, as above stated, each rack blank 50 on the cylinder 49 passes through the generation position previously defined.

The cutter 11a was moved in the direction of arrow 6b by means of the crank 54, not represented in FIGS. 6 and 7, until such a position was reached that the cutting edges 36b of the teeth 36 became tangent to a plane $R_1$—$R_1$, parallel to the reciprocating plane R—R and placed in generation position at a distance E from the face 50a of rack 50. This distance E represents the desired height of the teeth 50c of the rack to be cut. In other words, the cutter 11a was moved until a cutting position for a given cutting depth E was reached. The cutting edge 36b will then be at the position marked C in FIG. 7.

At this position, if the rack is supposed to be moving in the direction of arrow $Y_1$ and $Y_2$, disregarding at this time the rotary movement of the rack about the center line $g$—$g$, the faces 50a and 50b being kept—during this movement—parallel to the reciprocating plan R—R, the cutting edge 36c of the cutter 11a—during the rotary movement of the cutter about the turning axis X—X — will generate in the rack to be cut the straight profile C'''-A''' while the cutting edge 36b will generate the bottom of tooth of the rack C–B', which is coincident with the plane $R_1$—$R_1$. As the cutter is moving in the sense of arrow $Y_3$ and $Y_4$, the rack 50 would be generated.

Considering now that the rack actually rotates together with the cylinder 49 about the center line $g$—$g$, the assumed conditions are reproduced for every section of the rack 50 such as for instance the sections formed by the radial planes $G_1$—$G_1$, $G_2$—$G_2$, $G_3$—$G_3$ and others, when these sections coincide with the generation plan.

On rotating cylinder 49, therefore, at the instant when a particular plane $G_r$—$G_r$ among the infinite number of possible planes coincide when the generation plan G—G, the cutter 11a, rotating about the axis X—X and moving in either the two senses $Y_3$-$Y_4$ in the generation plane, G—G, will generate a straight profile C'''-A'''. The generated rack, therefore, has the same profile in every section with one of the radial planes $G_r$-$G_r$.

This particular characteristic, which is peculiar to the racks generated in the new machine, constitutes one of the new and advantageous characteristics of the machine which cannot be achieved by known machines and are absolutely unknown up to now. As a result of the above characteristic, it is possible, by using the new machine and following the new method, to automatically execute some finishing operations without using additional equipment, as were needed with the known methods and machines. In fact, as a result of the above stated, if a section of the rack generated with planes parallel to the reciprocating plan R—R is considered, said planes being the ones where the engagement takes place when the rack is coupled with its respective gear wheel, it will be noted that said section has the shape represented in section P—P of FIG. 7b. This figure represents the section of rack teeth with the engagement plane PP passing through the point P of rack 50.

It will be evident that the section has the shape illustrated in FIG. 7b from the following considerations:

The thickness of the teeth has been considered in the intersection of the medium section C–A of the rack 50 and the generation plan G—G and in the faces 50d and 50e, which are parallel to the generation plan.

The thickness N at point C will be equal to the thickness at point C', because these points have been generated with the same radius $r_c$ of the cutting edge $36_c$, or, in other words, because the points C and C' are located on the same circumference. Similar considerations may be applied with respect to points B and B', P and P', A and A', and to every point of the parallel sections considered, which are located on the same circumferences, and in which the thickness of the teeth will be respectively N, $N_1$, $N_2$, $N_3$.

Considering now the section in engaging planes parallel to the plane $R_1$—$R_1$ and passing through points C, B, P and A, to the point C will correspond, on the considered plane, the point B'; to the point B, will correspond the point P'; and to the point P will correspond the point A'. Examining now the thickness of the teeth in the intersection of planes parallel to the reciprocating plane R—R, with planes parallel to the generation plane G—G, it will be noted that said thickness is variable, the thickness at B being greater than the thickness at the corresponding point B'. It is evident, therefore, from FIG. 7, that in any plane of engagement the section is similar to the one represented in FIG. 7b. In the flanks of the teeth a desirable bulge or crowning will be automatically produced by the new machine and method without using the specific additional equipment which is needed in other known machines and methods.

Besides the above cited specific characteristics, the new rack generating machine in accordance with the invention, has the remarkable advantage that with this machine it is possible to cut simultaneously all the rack blanks mounted on cylinder 49, in the same time that was required to cut one rack by the conventional methods. The number of rack blanks 50 which can be mounted on cylinder 49, as well as the crowning produced is, obviously, a function of the radius R of the cylinder 49 and of the size of the racks to be generated and are limited only by the capacity of the machine.

As above stated in discussing the new machine for cutting cylindrical gear wheels with straight or helicoidal teeth and the new machine for cutting racks with straight or helicoidal teeth, the cutter used is a gear wheel of suitable characteristics which are selected in relation to the series of gear wheels or racks to be generated, the axis of the cutter forming an angle $\alpha$ with the piece to be cut.

The flanks of the teeth of the gear wheel used as cutter do not have any special surface but have the same surface as is usually found in any cylindrical gear wheel, this surface being obtained by the usual methods for manufacturing cylindrical gear wheels, and by using the standard machines usually employed to cut and to rectify precision cylindrical gear wheels.

The necessary relief and clearance for the cutting action of the cutting edge which is obtained by grinding a conical surface coaxial with the cutter turning axis, are automatically obtained as a result of the position of the cutter with respect to the piece to be cut.

Referring to FIG. 8, it will be noted that as a result of the existing clearances derived from the position of the cutter, it is not necessary to make any relief and clearance angles in the cutter. All facts which will be stated are valid for all applications of the method, and the description of a cylindrical gear cutter does not involve any limitation of the invention since a helicoidal gear cutter could be used.

FIG. 8 shows the relative position of the cutter 11 and of the blank 50f, as previously described in connection with FIG. 1. It is evident that the frontal clearance between the bottom 37 of the tooth to be cut and the head 36b of the cutting tooth, which is needed to ensure the free cutting action of the cutting edge 36a is automatically provided as a result of the inclination angle $\alpha$ of the cutter turning axis X—X with respect to the gear blank turning axis y—y or $Y_3$-$Y_4$. The end relief angle is the same angle $\alpha$.

The lateral clearance at the cutting edge flanks is also automatically provided by means of said $\alpha$ inclination angle and as a result of the tooth involute profile shape. As a matter of fact, it is known that the width of the involute profile tooth varies from base to head, the tooth head being thinner than the tooth base.

If several teeth profiles, obtained by intersection of planes $G_4$—$G_4$ and $G_5$—$G_5$, parallel to the generation plane, with the tooth 36, are projected on the generation plane G—G, it will be seen, as is evident from FIGS. 8 and 8a, that in the reciprocating plane RR, which contains the directions $Y_1$ and $Y_2$ of the main reciprocating movements previously described, and in any plane parallel to the same passing through the teeth 36, the width of the tooth 36 is a maximum at the intersection of said planes with the generation plane G—G, the width being always smaller at the intersection of planes located above the generation plane as, for instance the plane $G_4$—$G_4$, $G_5$—$G_5$, and so on. Considering the plane $R_1$—$R_1$, for instance, it will be seen that the tooth 36 has a width $H_3$—$H_3$ at the intersection with plane G—G; a width $I_1$ smaller than $H_1$, in the plane $G_4$—$G_4$; and a width $V_1$, still smaller than $I_1$ and than $H_1$, in the plane $G_5$—$G_5$. The above stated clearly demonstrates that the lateral clearance which is needed for the suitable cutting action of the cutting edges of teeth 36 is obtained consequently to the inclination of the axis X—X, as previously defined.

It is obvious that in order to provide the required clearance it is not necessary to create involute helicoidal surfaces at the flanks of the teeth, as well as other known inconveniences, which are completely avoided by the present invention, because the flanks of the used cutter 11 are similar to the flanks of any cylindrical gear wheel with involute profile teeth.

Due to the fact that the teeth of the cutter have the same profile and thickness in any section in planes perpendicular to the turning axis X—X, the successive sharpening operations do not alter the profile and the thickness of the teeth and consequently the working conditions of the cutter 11 will remain unchanged during all its useful life.

Having thus described and represented my invention, what I claim is:

1. A machine for cutting rack bar teeth, comprising, in combination, a rotary cutter gear means having a first axis of rotation; blank holder means rotatable about a second axis transverse to said first axis and adapted for holding at least one rack bar blank in a position parallel to said second axis and in meshing engagement with said cutter gear means; and operation control means for moving in a timed sequence one of said means in a direction inclined at an acute angle to said first axis of said cutter gear means for effecting cutting of said rack bar blank by said gear cutter means in a generating movement.

2. A machine for cutting rack bar teeth, comprising, in combination, a rotary cutter gear means having a first axis of rotation; blank holder means rotatable about a second axis transverse to said first axis and adapted for holding at least one rack bar blank in a position parallel to said second axis and in meshing engagement with said cutter gear means; and operation control means for rotating said cutter gear means, and said blank holder means so as to move said blank in a direction inclined at an acute angle to said first axis of said cutter gear means for effecting cutting of said rack bar blank by said gear cutter means in a generating movement.

3. A machine for cutting rack bar teeth, comprising, in combination, a rotary cutter gear means having a first axis of rotation; cylindrical blank holder means having a second axis transverse to said first axis and being rotatable about said second axis and adapted for holding a plurality of rack bar blanks in circumferentially disposed positions extending parallel to and equidistant from said second axis, and located relative to said cutter gear means so that said blanks successively engage said cutter gear means in meshing engagement during rotation of said blank holder means; and operation control means for moving in a timed sequence one of said means in a direction inclined at an acute angle to said first axis of said cutter gear means for effecting cutting of said rack bar blanks by said gear cutter means in a generating movement 4. A machine for cutting rack bar teeth, comprising, in combination, a rotary cutter gear means having a first axis of rotation; cylindrical blank holder means having a second axis transverse to said first axis and being rotatable about said second axis and adapted for holding a plurality of rack bar blanks in circumferentially disposed positions extending parallel to and equidistant from said second axis, and located relative to said cutter gear means so that said blanks successively engage said cutter gear means in meshing engagement during rotation of said blank holder means; and operation control means for rotating said cutter gear means, and said blank holder means so as to move said blanks in a direction inclined at an acute angle to said first axis of said cutter gear means for effecting cutting of said rack bar blanks by said gear cutter means in a generating movement.

5. A machine for cutting rack bar teeth, comprising, in combination, a cylindrical rotary cutter gear means having a first axis of rotation; blank holder means rotatable about a second axis transverse to said first axis and adapted for holding at least one rack bar blank in a position parallel to said second axis and in meshing engagement with said cutter gear means; and operation control means for moving in a timed sequence one of said means in a direction inclined at an acute angle to said first axis of said cutter gear means for effecting cutting of said rack bar blank by said gear cutter means in a generating movement while said cylindrical cutter gear means defines a relief angle with said rack bar blank.

6. A machine for cutting rack bar teeth, comprising, in combination, a cylindrical rotary cutter gear means having a first axis of rotation; cylindrical blank holder means having a second axis for turning movement about a second axis transverse to said first axis and being rotatable about said second axis and adapted for holding a plurality of rack bar blanks in circumferentially disposed positions extending parallel to and equidistant from said second axis, and located relative to said cutter gear means so that said blanks successively engage said cutter gear means in meshing engagement during rotation of said blank holder means; and operation control means for rotating said cutter gear means, and said blank holder means so as to move said blanks in a direction inclined at an acute angle to said first axis of said cutter gear means for effecting cutting of said rack bar blanks by said gear cutter means in a generating movement while said cylindrical cutter gear means defines a relief angle with said rack bar blanks.

7. A machine for cutting rack bar teeth, comprising, in combination, a rotary cutter gear means having a first axis of rotation; a cylindrical blank holder means having a second axis transverse to said first axis and being rotatable about said second axis and adapted for holding a plurality of rack bar blanks in circumferentially disposed positions extending parallel to and equidistant from said second axis, and located relative to said cutter gear means so that said blanks successively engage said cutter gear means in meshing engagement during rotation of said blank holder means; and operation control means for rotating said cutter gear means, and said blank holder means so as to move said blanks in a direction inclined at an acute angle to said first axis of said cutter gear means for effecting cutting of said rack bar blanks by said gear cutter means in a generating movement, said operation control means moving one of said means in a direction parallel to said second axis in timed relation with the rotary movement of said blank holder means.

8. A machine for cutting rack bar teeth, comprising, in combination, a cylindrical rotary cutter means having a first axis of rotation; cylindrical blank holder means having a second axis transverse to said first axis and being rotatable about said second axis and adapted for holding a plurality of rack bar blanks in circumferentially disposed positions extending parallel to and equidistant from said second axis, and located relative to said cutter gear means so that said blanks successively engage said cutter gear means in meshing engagement during rotation of said blank holder means; and operation control means for rotating said cutter gear means, and said blank holder means so as to move said blanks in a direction inclined at an acute angle to said first axis of said cutter gear means for effecting cutting of said rack bar blanks by said gear cutter means in a generating movement while said cylindrical cutter gear means defines a relief angle with said rack bar blanks, said operation control means moving one of said means in a direction parallel to said second axis in timed relation with the rotary movement of said blank holder means.

9. A machine for cutting rack bars, comprising, in combination, a first support means turnable about a first axis; a second support means, one support means of said first and second support means being movable in direction of said first axis; at least one holder mounted on said first support means for holding a rack bar blank extending parallel to said first axis; a rotary cutter gear mounted on said second support means for turning movement about a second axis transverse to said first axis and having a cutting edge moving in a first plane passing through said first axis during movement of said one support means in direction of said first axis so that said cutting edge is in meshing engagement with said rack bar blank when the same passes through said first plane while moving in a second plane perpendicular to said first plane during rotation of said first support means, the axis of said rotary cutter gear being inclined to said second plane at an acute angle; and operation control means for rotating said cutter means, and for moving said one support in said direction of said first axis at interrelated selected speeds.

10. A machine for cutting rack bars, comprising, in combination, a first support means turnable about a first axis; a second support means, one support means of said first and second support means being movable in direction of said first axis; a plurality of holder means mounted on said first support means for holding a plurality of rack bar blanks parallel and equidistant to said axis; a rotary cutter gear mounted on said second support means for turning movement about a second axis transverse to said first axis and having a cutting edge moving in a first plane passing through said first axis during movement of said one support means in direction of said first axis so that said cutting edge successively meshes with said rack bar blanks when the same pass successively through said first plane, each rack bar blank moving in a second plane perpendicular to said first plane when engaged by said cutting edge of said cutter gear, the axis of said rotary cutter gear being inclined to said second plane at an acute angle; and operation control means for rotating said first support, for rotating said cutter means, and for moving said one support in said direction of said first axis at interrelated selected speeds.

11. A machine for cutting rack bars, comprising, in combination, a first support means turnable about a first axis; a second support means movable in direction of said first axis; a plurality of holder means mounted on said first support means for holding a plurality of rack bar blanks parallel and equidistant to said axis; a rotary cutter gear mounted on said second support means for turning movement about a second axis transverse to said first axis and having a cutting edge moving in a first plane passing through said first axis during movement of said second support means in direction of said first axis so that said cutting edge successively meshes with said bar blanks when the same pass successively through said first plane, each rack bar blank moving in a second plane perpendicular to said first plane when engaged by said cutting edge of said cutter gear, the axis of said rotary cutter gear being inclined to said second plane at an acute angle; and operation control means for rotating said first support, for rotating said cutter means, and for moving said second support in said direction of said first axis at interrelated selected speeds.

12. A machine for cutting rack bars, comprising, in combination, a first support means turnable about a first axis; a second support means, one support means of said first and second support means being movable in direction of said first axis; at least one holder mounted on said first support means for holding a rack bar blank extending parallel to said first axis; a rotary cutter gear mounted on said second support means for turning movement about a second axis transverse to said first axis and having a cutting edge moving in a first plane passing through said first axis during movement of said one support means in direction of said first axis, one support means being movable in a direction perpendicular to said axis in said first plane so that said cutting edge is in meshing engagement with said rack bar blank when the same passes through said first plane while moving in a second plane perpendicular to said first plane during rotation of said first support means, the axis of said rotary cutter gear being inclined to said second plane at an acute angle; and operation control means for rotating said first support, for rotating said cutter means, and for moving said one support in said direction of said first axis at interrelated selected speeds, and for moving said one support means perpendicular to said axis for adjusting the depth of the cut.

13. A machine for cutting racks bars, comprising, in combination, a first support means turnable about a first axis; a second support means, one support means of said first and second support means being movable in direction of said first axis; a plurality of holder means mounted on said first support means for holding a plurality of rack bar blanks parallel and equidistant to said axis; a rotary cutter gear mounted on said second support means for turning movement about a second axis transverse to said first axis and having a cutting edge moving in a first plane passing through said first axis during movement of said one support means in direction of said first axis, one support means being movable in a direction perpendicular to said axis in said first plane so that said cutting edge successively meshes with said rack bar blanks when the same pass successively through said first plane, each rack bar blank moving in a second plane perpendicular to said first plane when engaged by said cutting edge of said cutter gear, the axis of said rotary cutter gear being inclined to said second plane at an acute angle; and operation control means for rotating said first support, for rotating said cutter means, and for moving said one support in said direction of said first axis at interrelated selected speeds, and for moving said one support means perpendicular to said axis for adjusting the depth of the cut.

14. A machine for cutting rack bars, comprising, in combination, a first support means turnable about a first axis; a second support means movable in direction of said first axis; a plurality of holder means mounted on said first support means for holding a plurality of rack bar blanks parallel and equidistant to said axis; a rotary cutter gear mounted on said second support means for turning movement about a second axis transverse to said first axis and having a cutting edge moving in a first plane passing through said first axis during movement of said second support means in direction of said first axis, said second support means being also movable in direction perpendicular to said axis in said first plane so that said cutting edge successively meshes with said rack bar blanks when the same pass successively through said first plane, each rack bar blank moving in a second plane perpendicular to said first plane when engaged by said cutting edge of said cutter gear, the axis of said rotary cutter gear being inclined to said second plane at an acute angle; and operation control means for rotating said first support, for rotating said cutter means, and for moving said second support in said direction of said first axis at interrelated selected speeds, and for moving said second support means perpendicular to said first axis for adjusting the depth of the cut.

15. A machine for cutting rack bars as set forth in claim 14 wherein said cutter gear is cylindrical and has a conical recessed end face forming said cutting edge with the teeth of said cutter gear, said end face being located in a plane inclined to the first and second planes.

16. A machine for cutting rack bars as set forth in claim 14 wherein said operation control means include variable transmission means for changing the transmission ratio between said first support and said cutter means.

17. A machine for cutting rack bars as set forth in claim 16 including operating means for moving said second support means, and wherein said variable transmission means are also connected to said operating means.

18. A machine for cutting rack bars, comprising, in combination, a first support means turnable about a first axis; a second support means, one support means of said first and second support means being movable in direction of said first axis; at least one holder mounted on said first support means for holding a rack bar blank extending parallel to said first axis; a rotary cutter gear mounted on said second support means for turning movement about a second axis transverse to said first axis and having helicoidal teeth and a cutting edge moving in a first plane passing through said first axis during movement of said one support means in direction of said first axis so that said cutting edge is in meshing engagement with said rack bar blank when the same passes through said first plane while moving in a second plane perpendicular to said first plane during rotation of said first support means, the axis of said rotary cutter gear being inclined to said second plane at an acute angle; and operation control means for rotating said first support, for rotating said cutter means, and for moving said one support in said direction of said first axis at interrelated selected speeds, said operation control means including means controlling the speed of movement of said one support means for cutting helical teeth on said rack bar.

19. A machine for cutting rack bars, comprising, in combination, a first support means turnable about a first axis; a second support means movable in direction of said first axis; a plurality of holder means mounted on said first support means for holding a plurality of rack bar blanks parallel and equidistant to said axis; a rotary cutter gear mounted on said second support means for turning movement about a second axis transverse to said first axis and having helicoidal teeth and a cutting edge moving in a first plane passing through said first axis during movement of said second support means in direction of said first axis so that said cutting edge successively meshes with said rack bar blanks when the same pass successively through said first plane, each rack bar blank moving in a second plane perpendicular to said first plane when engaged by said cutting edge of said cutter gear, the axis of said rotary cutter gear being inclined to said second plane at an acute angle; and operation control means for rotating said first support, for rotating said cutter means, and for moving said second support in said direction of said first axis at interrelated selected speeds, said operation control means including means for controlling the speed of movement of said second support means for cutting helical teeth on said rack bar.

References Cited by the Examiner
UNITED STATES PATENTS

| | | | |
|---|---|---|---|
| 670,859 | 3/1901 | Fellows | 90—7 |
| 1,820,409 | 8/1931 | Trbojevich | 90—4 |

FOREIGN PATENTS

| | | |
|---|---|---|
| 929,353 | 7/1947 | France. |
| 541,693 | 4/1956 | Italy. |

WILLIAM W. DYER, Jr. *Primary Examiner.*